United States Patent [19]

Moss

[11] Patent Number: 4,737,001

[45] Date of Patent: Apr. 12, 1988

[54] HOLOGRAPHIC INDICATOR FOR DETERMINING VEHICLE PERIMETER

[75] Inventor: Gaylord E. Moss, Marina del Rey, Calif.

[73] Assignee: Hughes Aircraft Company, Los Angeles, Calif.

[21] Appl. No.: 794

[22] Filed: Jan. 6, 1987

[51] Int. Cl.⁴ .................. B60Q 1/46; G02B 27/22
[52] U.S. Cl. ..................... 350/3.6; 340/103; 340/104; 350/3.75
[58] Field of Search ............... 350/3.6–3.69, 350/3.75, 3.76, 174, 631, 632; 340/103, 104, 97, 99

[56] References Cited

U.S. PATENT DOCUMENTS

| | | | |
|---|---|---|---|
| 1,964,873 | 7/1934 | Dujardin | 350/632 |
| 2,039,474 | 5/1936 | Brunette | 350/632 |
| 2,658,967 | 10/1953 | Matschke, Jr. | 340/104 |
| 3,521,234 | 7/1970 | Davin | 340/104 |
| 3,603,929 | 9/1971 | Drysdale | 340/104 |
| 3,767,292 | 10/1973 | Rutkowski | 350/631 |
| 3,868,629 | 2/1975 | Caine | 340/104 |
| 4,613,200 | 9/1986 | Hartman | 350/3.7 |

Primary Examiner—Bruce Y. Arnold
Assistant Examiner—Martin Lerner
Attorney, Agent, or Firm—Robert Thompson; A. W. Karambeleas

[57] ABSTRACT

A holographic indicator for determining a vehicle perimeter location is provided. A substantially transparent hologram member can be fixed to either the windshield or the rear window and contains a holographic image of indicia representing a virtual image of an indicator that will correspond spatially to a perimeter location of a vehicle body when appropriately illuminated. A light source can be selectively illuminated by the driver to realize the virtual image of the indicator to assist him in close manuevering, such as parking.

19 Claims, 2 Drawing Sheets

U.S. Patent   Apr. 12, 1988   Sheet 1 of 2   4,737,001
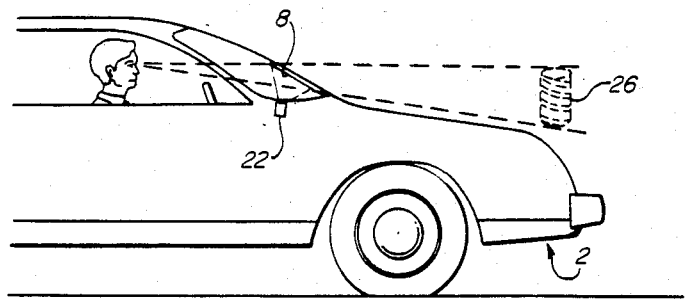
FIG. 1
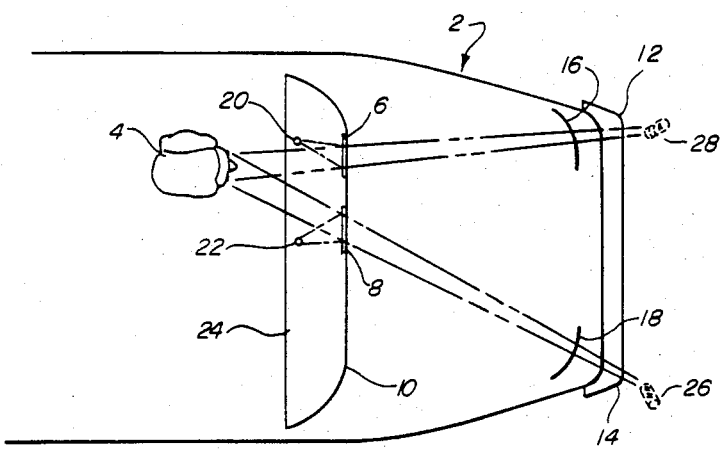
FIG. 2
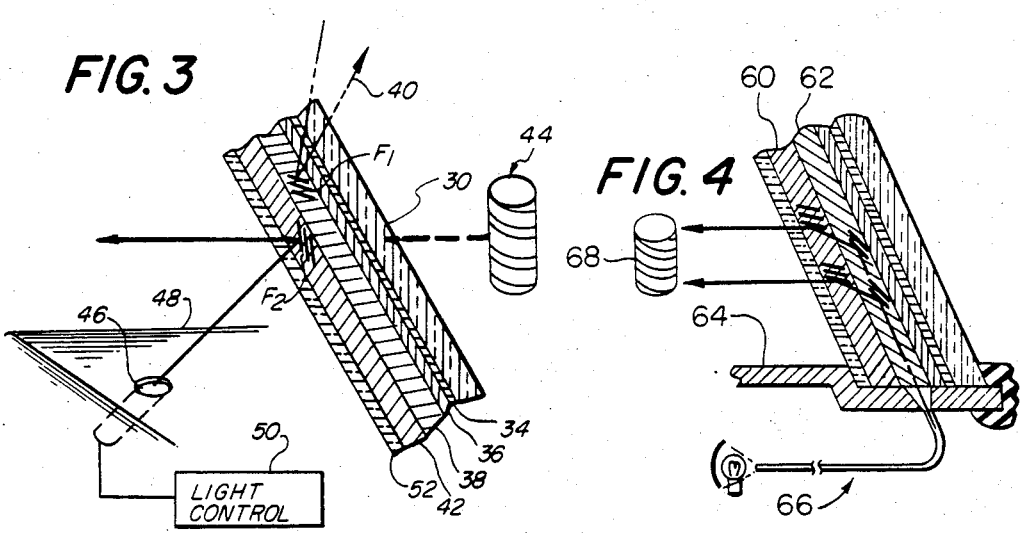

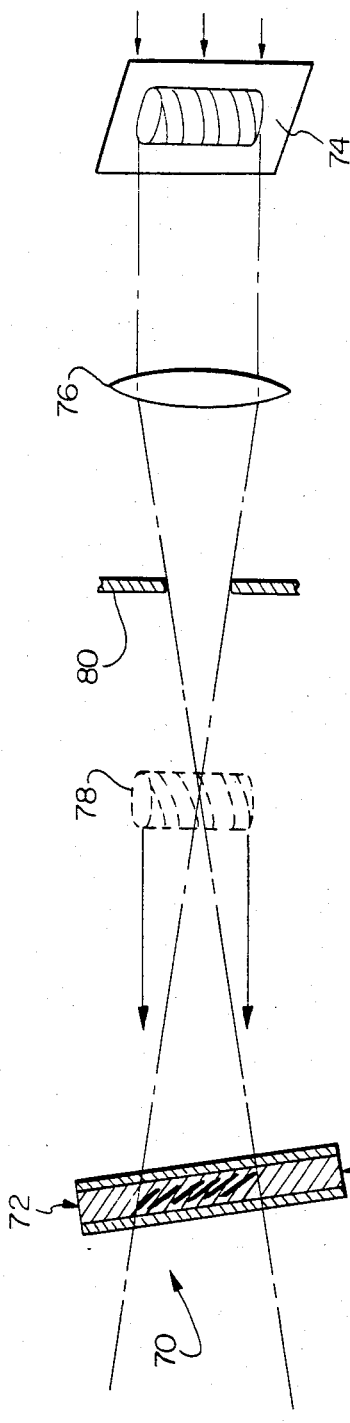
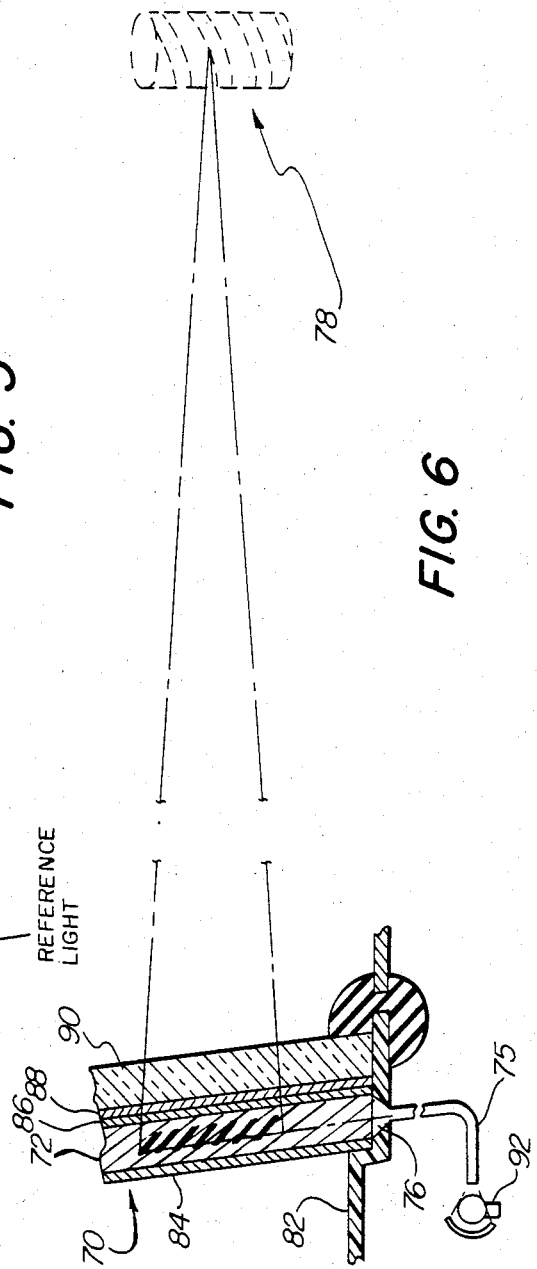
FIG. 5
FIG. 6

HOLOGRAPHIC INDICATOR FOR DETERMINING VEHICLE PERIMETER

BACKGROUND OF INVENTION

1. Field of Invention

The present invention relates to an indicator or marker that can be mounted within the line of sight of the driver of a vehicle to determine the actual perimeter location of the vehicle and, more particularly, to a substantially transparent hologram member that can provide a virtual image of an indicator of the perimeter of the vehicle at the option of the driver.

2. Description of Related Art

The high cost of fuel and the demands of federal regulations to provide fuel efficient cars have caused car manufacturers to take into consideration aerodynamic factors and to slope the perimeters of the car to provide a low drag coefficient. As a result, the corners or the perimeter locations of the car cannot be seen from the driver's position. This can cause problems in parking the vehicle and other close maneuvering activities because the driver must make judgments on the actual existence of the perimeter of the car without actually being able to see it. In the past, vehicles have used fender markers such as vertical wands attached to the corner of the car to extend into the line of sight of the driver. These prior art solutions, however, are not applicable to a modern car from either an aesthetic or wind drag consideration. Thus, these prior art solutions are not available to provide visual clues for a driver to judge his car's perimeter and he must perform the difficult task of estimation in any close maneuvering, such as parking.

The demands on the design configurations of modern car bodies have created a problem that cannot be solved by prior art solutions.

SUMMARY OF THE INVENTION

Apparatus is provided for the selected simulation of an apparent edge or perimeter of a vehicle body within the line of sight of the driver. The present invention can be accomplished in a relatively inexpensive manner by providing substantially transparent hologram members that can be laminated to the front and rear windows of the vehicle in positions that would correspond to being within the line of sight of the driver looking towards the location where the corner, which is not visible to him, should be located. The hologram member comprises substantially a transparent substrate that can be affixed to the interior of, for example, the windsheild or the rear window, and supports a holographic image of indicia representing a virtual image of an indicator that would correspond spatially to a perimeter location of the vehicle body when appropriately illuminated. Adjacent the respective hologram members is a source of light for illuminating the holographic image at the appropriate angle and appropriate bandwidth to realize the virtual image. Thus, the hologram member will be transparent during normal operating conditions of the vehicle and will only realize the marker indicia when desired by the operator in activating an appropriate illumination, such as fiber optics carrying light to each of the holograms. The hologram member can further contain one or more additional film layers of a holographic material to provide a reflective surface to provide a folded optical path for cutting down on any stray light that could inadvertently realize the image or to provide an optical filter effect to prevent any inadvertent realization of an image from stray light. This guard hologram can be positioned on the exterior of the hologram member that is adjacent the interior surface of the windshield, and will have developed therein holographic images such as grating planes throughout that film layer that can be selective to both the wavelength and angle of incidence of light to prevent any inadvertent illumination of the desired hologram marker indicia from exterior lighting. Thus, a substantially transparent perimeter indicator is provided within the viewing angle of the driver to permit a selective realization of an apparent perimeter edge of the vehicle body.

Alternatively, a hologram member having a single holographic film layer can be illuminated on its edge through a fiber optic coupler to realize the image.

The foregoing and other objects, advantages, and features of the present invention will become apparent from the following description taken in conjunction with the accompanying drawings which illustrate a specific embodiment of the invention.

BRIEF DESCRIPTION OF THE DRAWINGS

In the accompanying drawings:

FIG. 1 shows a schematic of a vehicle with a transparent hologram member mounted on the windshield of the vehicle to provide a virtual image of a perimeter marker;

FIG. 2 discloses a schematic plan view of the relationship of the driver, the windshield with the hologram members, the visible edge of the car, and the virtual marker image indicia; and FIG. 3 is an exaggerated schematic cross-sectional view of a dual layer hologram member on the rearview window;

FIG. 4 is an exaggerated schematic cross-sectional view of an edge lit dual holographic member;

FIG. 5 is an exaggerated schematic cross-sectional view of the construction of a hologram; and FIG. 6 is an exaggerated schematic cross-sectional view of an edge lit embodiment of FIG. 5.

In the following description, like parts are designated by like reference numbers through the several drawings.

DETAILED DESCRIPTION OF THE PREFERRED EMBODIMENTS

The following description is provided to enable any person skilled in the optical and automotive fields to make and use the invention and sets forth the best modes contemplated by the inventor of carrying out his invention. Various modifications, however, will remain readily apparent to those skilled in the arts since the generic principles of the present invention have been defined herein specifically to provide a relatively economical and easily manufactured hologram apparatus for the selective simulation of an apparent edge of a vehicle body.

Referring to FIG. 1, a vehicle 2 has a body that has been designed to conserve fuel through a configuration that achieves a low coefficient of wind drag. As a result, the drooped or slanted ends of the vehicle, both in the front and rear, cannot be seen by the driver when he is positioned behind a steering wheel for directing the motion of the car. Thus, the driver has no visual clues to judge his car's perimeter but must perform a difficult estimation task in any close maneuvering, such as parking.

In order to provide the driver with a visual reference, the present invention attaches transparent hologram members or decals to those automobile window areas through which the driver would normally look towards the corners of the vehicles. As shown in FIG. 1, each hologram member can display a three dimensional image or marker indicia of a reference object projecting up in the field of view of the driver appearing to be located at the corner distance. The driver can then use these holographically generated apparent objects to judge the distance to the perimeter of his car during maneuvering. Since a hologram is capable of generating a wavefront that corresponds to a real image, the driver will have all the depth clues that he would normally have from viewing a real object.

Referring to FIG. 2, the driver 4 can have a pair of hologram members 6 and 8 mounted on the internal surface of the vehicle windshield 10. As can be seen, the location of the mounting of the hologram members 6 and 8 correspond with the normal line of sight of a driver as he would look towards the corner perimeter 12 and 14 of the vehicle. The driver is only capable of seeing the vehicle at position 16 and 18 when seated behind the steering wheel. The phantom lines indicate the actual extent of the vehicle perimeter while the lines 16 and 18 represent the extent of the vehicle perimeter that the driver can actual visualize. As can be seen, there is a marked increase in the actual size of the vehicle perimeter that is not available for observation by the driver. Respective directional light sources 20 and 22 can be mounted within the dashboard 24, e.g., from fiber optic conduits connected to a light source in the dashboard, for directing light for illumination of the respective holograms 6 and 8 at the appropriate angle and the appropriate bandwidth of energy to create the virtual image of the indicia marker 26 and 28. The driver can activate an appropriate light control, not shown in FIG. 2, to actually realize the virtual images 28 and 26 selectively as desired by the driver.

Referring to FIG. 3, an exaggerated schematic view of the rearview window 30 is disclosed having a laminated hologram member 32 attached thereto. A flexible transparent substrate 36 can be adhered to the inside surface of the rearview window 30 by optical cement 34. A first holographic film layer 38 can carry a guard reflective image, such as illustrated as diffraction gratings F1 that is capable of reflecting away extraneous light such as the light ray 40. A second holographic film layer 42 can carry the desired wavefront image of the marker indicia 44 that can be projected to the driver through his rearview mirror or by directly looking across his shoulder at the rear corner of the vehicle when impacted from directional light from the light source 46 that is positioned within the rearview window deck 48. The holographic film layers 38 and 42 can be formed of conventional film coatings such as poly-N-vinyl carbazole or a dichromated gelatin such as disclosed in known reference books, e.g., "Dichromated Gelatin For The Fabrication Of Holographic Optic Elements" by Chang et al., Applied Optics, Vol. 18, pgs. 2407-17 (1979). Finally, an abrasion resistant and moisture protection layer 52 is deposited on the second hologram film layer 42, such as a film silicon dioxide or a silicon nitride.

The holographic procedures for forming the hologram of the present invention can be found in known reference works, such as "Optical Holography" by Collier et al., Academic Press, New York, N.Y. (1971). Additionally, the holographic image can be developed to be particularly sensitive to only a predetermined bandwidth or ray angles of the illumination source. As is well known in the holographic field, the hologram can be made to operate over a broader wavelength or angle band giving increased brightness for a broadband source, but trading off the increased use of the source angle or bandwith with a lower phototopic see-through capability.

An appropriate conventional light control 50 can be selectively activated by the driver to realize the virtual image. Additionally, a composite diffraction grating of both the indicia holographic images and a reflective guard image could be developed in a single hologram layer such as will be disclosed in FIGS. 5 and 6.

As disclosed in FIG. 2, the virtual image 44 will also appear to be spatially positioned at a rear corner of the vehicle in the similar manner that the virtual images 28 and 26 are spatially positioned to be apparently located at the front corners of the vehicle.

FIG. 4 discloses an alternative embodiment with dual hologrpahic layers 60 and 62 mounted in the dashboard 64 of the vehicle. A fiber optic illumination system 66 can be optically connected to one layer 62 that reflects lights through the transmission layer 64 to realize the image 68.

The embodiment of FIG. 4 can be accomplished equivalently with a single holographic layer. The potential curvature distortion of the image contained within the holographic layer because of the physical envelope of the windshield should be taken into consideration during the construction of the hologram to compensate for any distortion, for example, the object source can be distorted to compensate for the effect of the window curvature, or the holographic layer can be physically defined in the same position that it will be mounted on the window to permit the development of the diffraction gratings to take into account the non-planar configuration.

FIG. 5 discloses a construction of a single layer hologram 70 wherein laser light from an illuminated object is directed at a holographic layer 72. A phase related reference laser light is directed along the length of the holographic layer in a fashion analogous to a wave guide. The interference pattern of the Source Light and the Reference Light is developed as the diffraction grating in the holographic layer. The predetermined incidia member 74, such as a diffuse transparency or real object, can be illuminated to provide a source object. A lens member 76 can focus the object to create a real image in space 78. An aperture member 80 can define the viewing aperture that is desired, for example, it may be desirable to limit the field angle of display to only the driver, in accordance with the SAE standard ellipse for 99% of the drivers.

In playback, the holographic layer 72 can be illuminated with a reference beam to form a virtual image in space. In this embodiment the reference beam is directed within the plane of the holographic layer to interact with the recorded holographic grating. In determining the bandwidth of the playback light beam, there is a tradeoff with the desired degree of resolution of the virtual image. That is, the larger the bandwidth, the less resolution for virtual images that are not in the plane of the hologram. By using edge lighting to introduce a reference beam numerous advantages can be realized. For example, the hologram can be mounted as a display and lit by one edge that will not be inadvertently blocked by exterior objects.

FIG. 6 represents a practical application of the embodiment of FIG. 5 mounted in a dashboard 82 adjacent the window shield. Such a mounting is of particular advantage in realizing an avoidance of internal light reflection towards the driver and in saving space since a fiber optic link can accommodate a remote light linkage with the hologram 70. The hologram 70 includes the anti-abrasive coating 84, the holographic layer 72 and the transparent substrate 86 that is attached by optical cement 88 to the interior of the window shield 90. The light source 92 transmits a replication of the Reference Light through a fiber optic link 75 to an optical coupler 76 that insures a proper light distribution into the edge of the holographic layer 72. This light distribution matches that which was used by the reference beam when the hologram was constructed.

As can be readily appreciated, the present invention can be installed on newly manufactured cars or can be provided as a retrofit kit comprising the light mechanism and hologram decals to modify an existing vehicle. The hologram members can be relatively inexpensive in mass production with substantially little weight addition to the vehicle. It also does not occupy any substantial space in the interior of the vehicle. Also, it does not mar the aesthetic design of the car thereby permitting the car designers to achieve the low coefficient wind drag that they seek while increasing the safety and maneuverability of the vehicle. Finally, the driver will have total control of the realization of the holographic indicia maker since it will be relatively invisible when not in use and further, will not be observed by observers exterior from the car.

Various modifications to the above described invention may be readily apparent to those skilled in the optical and automotive fields in view of the above described generic concepts. Therefore, the scope of the present invention should be interpreted solely from the following claims.

What is claimed is:

1. Apparatus for the selective simulation of an apparent edge of a vehicle body having a windshield and a rear window comprising:
    a substantially transparent hologram member capable of being fixed to one of the windshield and the rear window, the hologram member containing a holographic image of indicia representing a virtual image of an indicator that would correspond spatially to a perimeter location of the vehicle body when appropriately illuminated; and
    means for illuminating the holographic image to realize the virtual image at a predetermined time under control of an operator.

2. The invention of claim 1 wherein the hologram member includes a substantially transparent substrate, a film layer of a holographic material developed to retain a holographic image and a protective layer positioned across the holographic material.

3. The invention of claim 2 further including a second film layer of a holographic material developed to retain a holographic image of a reflective surface to provide a barrier to protect the indicator image whereby stray light is prevented from activating a realization of the image.

4. The invention of claim 1 wherein the means for illuminating includes a source of light that projects light at a predetermined angle and at a predetermined bandwidth to impact and realize the image within the angle of view of the driver.

5. The invention of claim 1 wherein the means for illuminating is connected to an edge of the hologram member.

6. The invention of claim 5 wherein the means for illuminating includes a fiber optic link connected to one edge of the hologram member and a light source.

7. The invention of claim 6 wherein the holographic image has a limited field angle of view whereby only the driver can normally view the image.

8. An improved pane of glass for installation in a vehicle body having a sloping vehicle body perimeter that cannot be observed from the driver's position, comprising:
    a transparent substrate of glass;
    a substantially transparent hologram member fixed to the substrate of glass at a position corresponding to a line of sight of a driver looking to the corner perimeter of the vehicle body, the hologram member containing a holographic image of a virtual image of an indicator that would spatially correspond to a perimeter location of the vehicle body when appropriately illuminated and would appear to the driver as being positioned at the perimeter corner location of the vehicle; and
    means for illuminating the holographic image to realize the virtual image at the option of the driver.

9. The invention of claim 8 wherein the hologram member includes a substantially transparent substrate, a film layer of a holographic material developed to retain a holographic image and a protective layer positioned across the holographic material.

10. The invention of claim 9 wherein the means for illuminating includes a fiber optic coupler for connection to the edge of the hologram member.

11. The invention of claim 9 wherein the means for illuminating includes a source of light that projects light at a predetermined angle and at a predetermined bandwidth to impact and realize the image within the angle of view of the driver.

12. The invention of claim 11 further including a second film layer of a holographic material developed to retain a holographic image of a reflective surface to protect the indicator image whereby stray light is prevented from activating a realization of the image.

13. Apparatus for the selective simulation of an indicator of an apparent perimeter edge of a vehicle body having a windshield and a rear window comprising:
    a plurality of substantially transparent hologram members capable of being fixed to the windshield and the rear window, each of the hologram members contains a holographic image of indicia representing a virtual image of an indicator that would correspond spatially to a perimeter location of the vehicle body when appropriately illuminated, each hologram member includes a substantially transparent substrate, a film layer of a holographic material developed to retain a first holographic image of a reflective type to reflect stray light, a second a holographic image of the indicia representative of the perimeter location and a protective layer positioned across the holographic material; and
    means for illuminating the holographic image to realize the virtual image at a predetermined time under control of an operator.

14. The invention of claim 13 wherein the means for illuminating includes a source of light that projects light at a predetermined angle and at a predetermined bandwidth to impact and realize the image within the angle of view of the driver.

15. The invention of claim 13 wherein the means for illuminating includes a source of light to reconstitute a reference light beam extending through a length of each hologram and introduced adjacent an edge of each hologram.

16. Apparatus for the selective simulation of an indicator of an apparent peripheral edge of a vehicle body, whose real edge is obstructed from the view of an operator, comprising:
means for generating a virtual image of an indicator that would correspond spatially to a perimeter location of the vehicle body; and
control means for realizing the virtual image, when desired by the operator of the vehicle, within his normal field of view.

17. The invention of claim 16 wherein the means for generating includes a hologram member having a substantially transparent substrate, a film layer of a holographic material developed to retain a holographic image and a protective layer positioned across the holographic material.

18. The invention of claim 17 wherein the control means includes means for illuminating a source of light that projects light at a predetermined angle and at a predetermined bandwidth to impact and realize the image within the angle of view of the driver.

19. The invention of claim 18 wherein the source of light is coupled to the hologram member along one edge of the hologram member.

* * * * *